Figure 1:
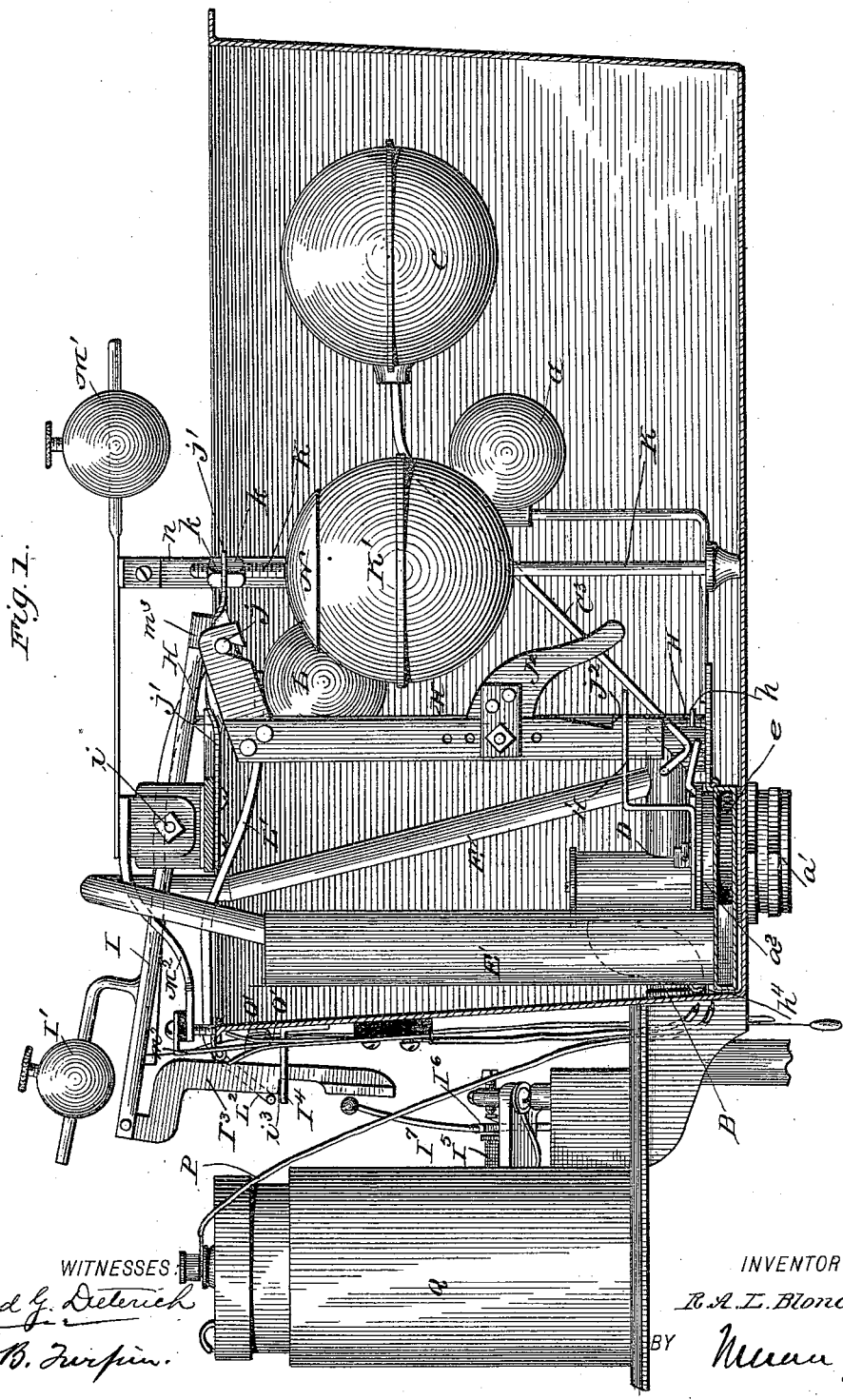

(No Model.)  5 Sheets—Sheet 1.

R. A. L. BLONDEL.
SANITARY SERVICE TANK FOR WATER CLOSETS.

No. 428,373.  Patented May 20, 1890.

WITNESSES:
Fred G. Dieterich
P. B. Turpin

INVENTOR:
R. A. L. Blondel
BY
ATTORNEYS

THE NORRIS PETERS CO., PHOTO-LITHO., WASHINGTON, D. C.

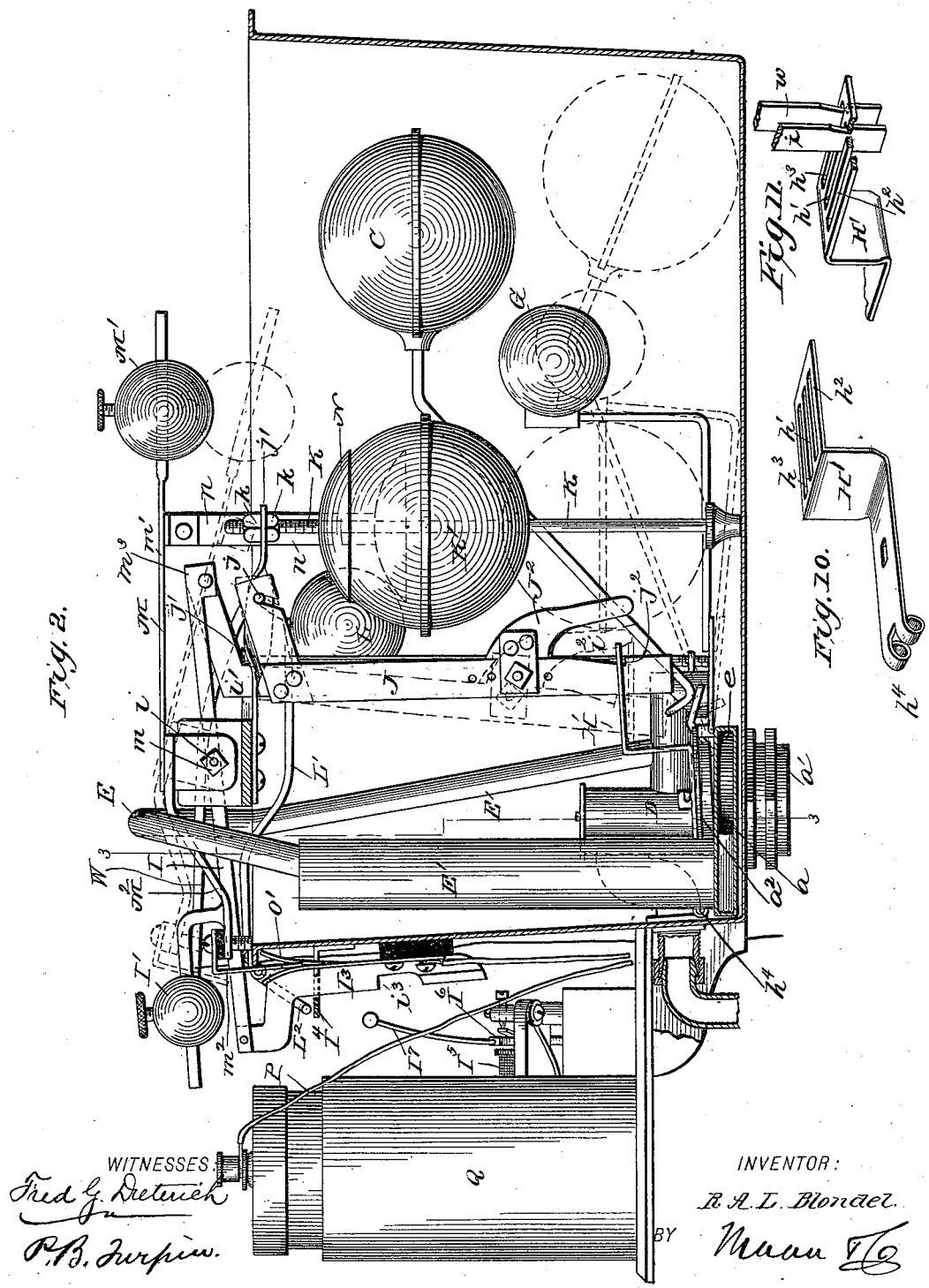

(No Model.) 5 Sheets—Sheet 3.
R. A. L. BLONDEL.
SANITARY SERVICE TANK FOR WATER CLOSETS.
No. 428,373. Patented May 20, 1890.
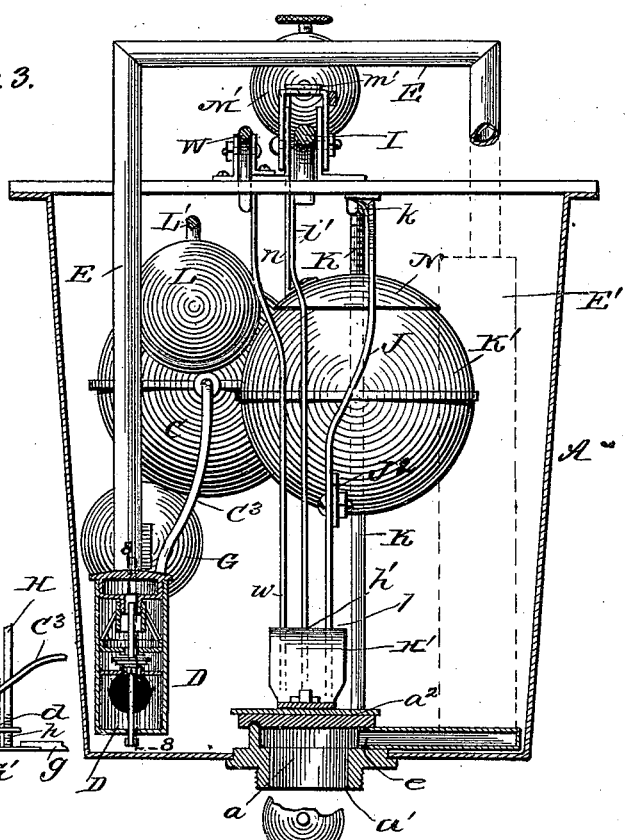
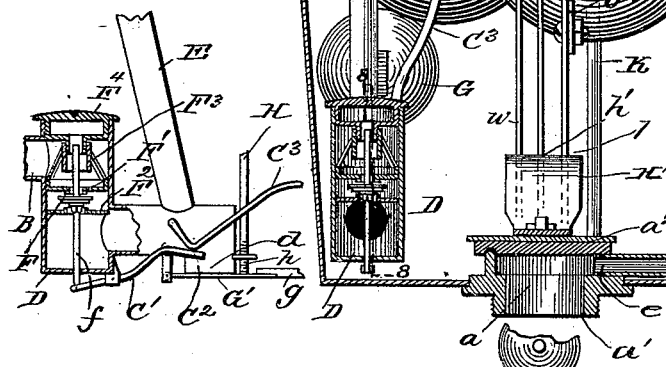
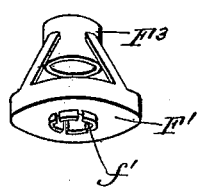
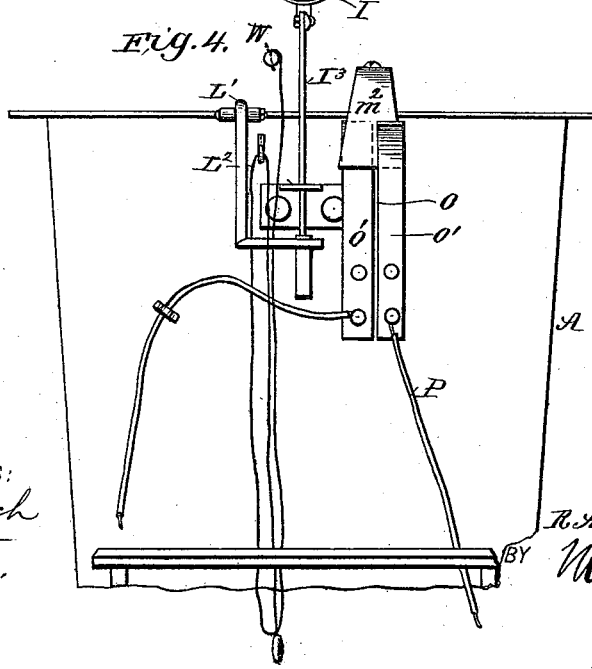
WITNESSES:
INVENTOR:
ATTORNEYS (No Model.) 5 Sheets—Sheet 4.
R. A. L. BLONDEL.
SANITARY SERVICE TANK FOR WATER CLOSETS.
No. 428,373. Patented May 20, 1890.
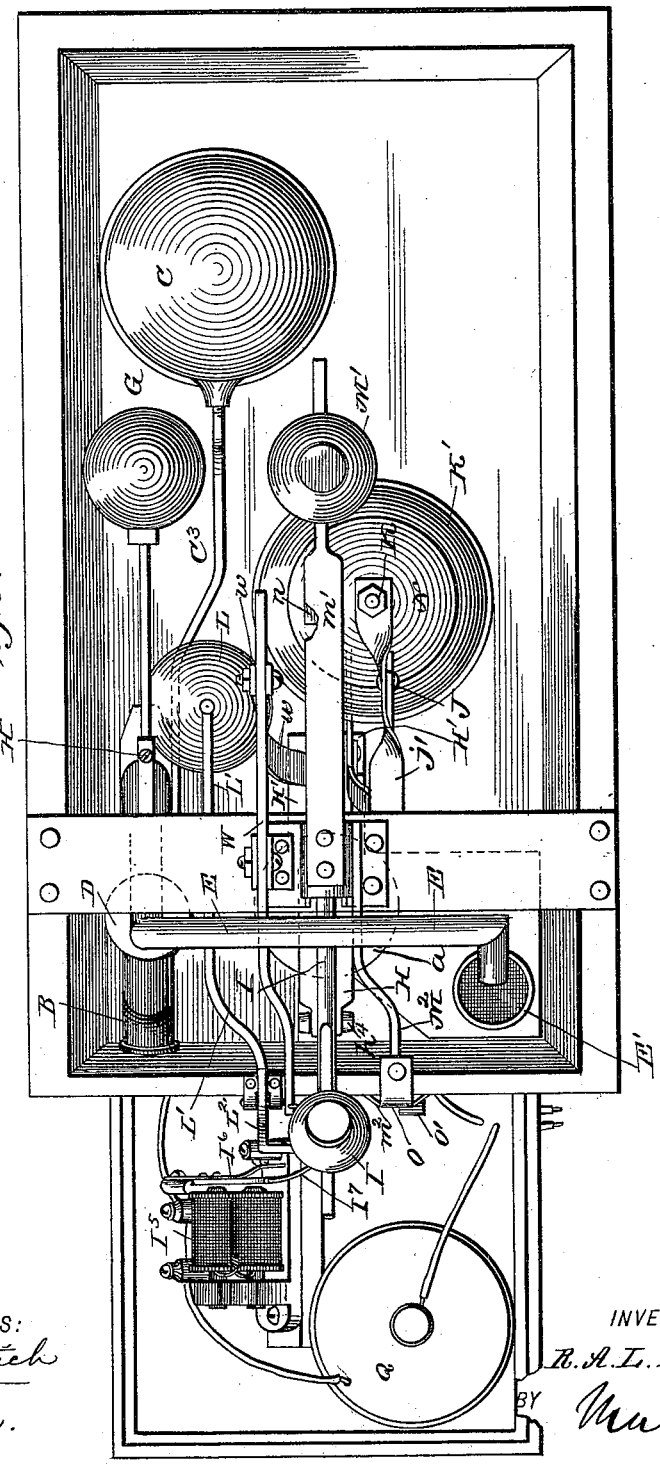
WITNESSES:
INVENTOR:
R. A. L. Blondel.
BY
ATTORNEYS (No Model.) 5 Sheets—Sheet 5.
R. A. L. BLONDEL.
SANITARY SERVICE TANK FOR WATER CLOSETS.
No. 428,373. Patented May 20, 1890.
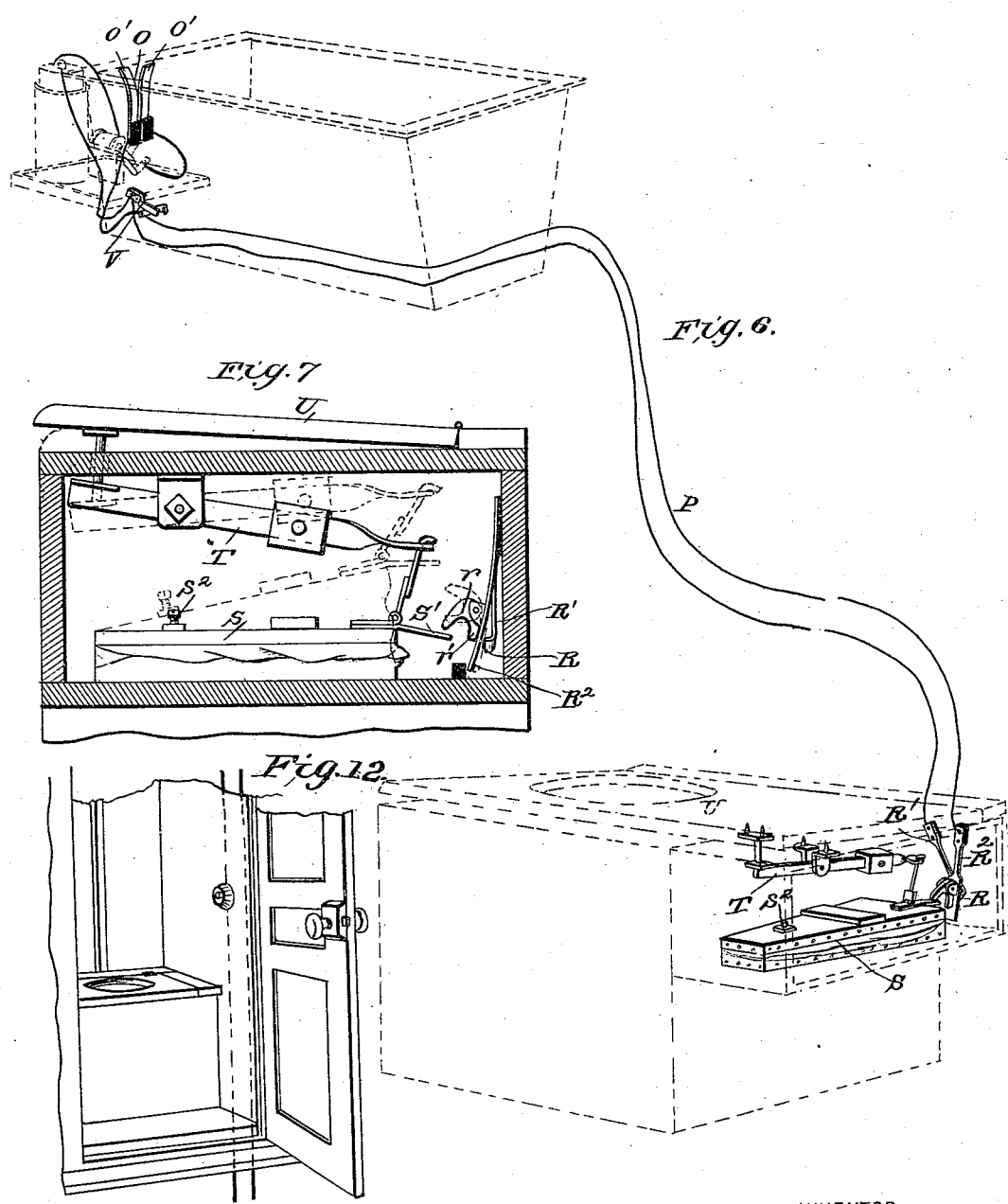
WITNESSES:
Fred G. Dieterich
P. B. Turpin.
INVENTOR:
R. A. L. Blondel.
BY Mann & Co.
ATTORNEYS
THE NORRIS PETERS CO., PHOTO-LITHO., WASHINGTON, D. C.

UNITED STATES PATENT OFFICE.

RICHARD A. L. BLONDEL, OF BALTIMORE, MARYLAND.

SANITARY SERVICE-TANK FOR WATER-CLOSETS.

SPECIFICATION forming part of Letters Patent No. 428,373, dated May 20, 1890.

Application filed November 25, 1889. Serial No. 331,577. (No model.)

*To all whom it may concern:*

Be it known that I, RICHARD A. L. BLONDEL, of the city of Baltimore, in the State of Maryland, have invented a new and useful Improvement in Sanitary Service-Tanks for Water-Closets, of which the following is a specification.

My invention is an improvement in water-closet tanks, and seeks among other improvements to provide a simple construction of weighted lever and electrically-operated latch mechanism, whereby by the closing of an electric circuit the weighted lever may be released to open the flushing-valve of the tank.
The invention has for a further object to provide a simple arrangement of levers and float, whereby the weight of one lever may, when the tank is empty, overbalance the weight of the other lever, and yet will, by the buoyancy of the float, be relieved of said lever when the tank is filled.

The invention has for further objects to provide, in connection with the tank and closet proper, a circuit having two breaks, a closer for one of such breaks arranged for operation whether the tank be full or empty, and a second closer arranged to be automatically operated as the tank fills and empties, so that such closer will close the circuit when the tank is full and break the circuit when the tank is empty.

The invention has for further objects other improvements; and it consists in certain novel constructions and combinations of parts, as will be hereinafter described and claimed.

In the drawings, Figure 1 is a side view of a closet-tank provided with my improvements, the tank being shown in section and the parts in the position they assume when the tank is full. Fig. 2 is a similar view to Fig. 1, the parts being in full lines, just as when the closet is tripped, the parts being in dotted lines, as when the tank is empty. Fig. 3 is a cross-section on line 3 3 of Fig. 2. Fig. 4 is an end view of the tank. Fig. 5 is a top plan view of the tank. Fig. 6 is a diagrammatic view showing the circuit and the several closers therefor. Fig. 7 is a detail view of the lower circuit-closer. Fig. 8 is a detail view of the inlet-controlling and deflecting valve mechanism on about line 8 8 of Fig. 3. Fig. 9 is a detail view of one of the valve-seats of such mechanism, and Fig. 10 is a detail view of the flushing-valve bar or arm. Fig. 11 is a detailed view, and Fig. 12 shows a modification.

In carrying out my invention I provide, in connection with the tank and its discharge-valve, a weighted lever by which to open such valve, a latch by which to hold said lever with its weight end elevated, electrically-operated devices for releasing said latch, a second lever arranged to overcome the weight of the valve-opening lever, and a float which, by its buoyancy, will overcome the weight of said second lever and free the valve-opening lever, so it may operate when its latch is released. In connection with such mechanism I employ a safety-float having an arm or portion by which to release the latch of the valve-lever when the water in the tank rises above its normal high-water mark.

Another important feature of my invention is the making of the electric circuit with two breaks and closers therefor, one of such closers being automatically operated by mechanism in the tank, so that when the tank is full the said closer will close its break and will open the same when the tank empties, so that the circuit can never be closed when the tank is emptied.

These and other features of my invention will be more fully described hereinafter.

The tank A may be of any desired form, and is provided with a discharge $a$, the pipe $a'$ leading from which connects with the closet proper in any suitable manner. Water is supplied to this tank by the pipe B, under the control of float C. This pipe B communicates with a valve-chamber D. The after-filling pipe E connects at one end with this chamber D, and is arranged to discharge its contents at $e$ into the discharge or flushing pipe $a'$ below the discharge-valve $a^2$.

In the chamber D, between the points at which pipes B E connect therewith, I provide the inlet-controlling valve F, which preferably is a disk secured to a rod $f$, which extends to position for engagement by lever C', which is arranged to be engaged at $C^2$ by the rod $C^3$, supporting the float C. This valve F has two seats—an upper one F' and a lower one $F^2$, said seats $F'$ and $F^2$ being arranged, respectively, in advance and in rear of the valve with respect to the inflowing water. The lower seat is constructed in connection with the valve to entirely shut off and stop the supply of water, while the seat $F'$ only limits the inflow of water, such seat $F'$ being formed with leaks $f'$, as shown, so that when the valve is against such seat $F'$ the inflow of water is not entirely stopped, but is only restricted, so that it will flow in comparatively slowly.

The water passes at $d$ from the chamber D out into the tank, such outlet $d$ being controlled by a valve $G'$ on the arm $g$ of the float G, the extent to which such valve $G'$ is permitted to close being regulated by the rod H, extended to the top of the tank, threaded at $h$ in a suitable bearing, and arranged to engage the valve $G'$ or rod $g$ to limit the closing movement of the said valve. It will be noticed from the relative position of floats C and G that the latter will reach its uppermost position before the former, so that valve $G'$ will be closed so far as it can be before the float C permits the valve F to close against its seat $F^2$. The pipe E, it will be noticed, connects with the chamber D between the valves F and $G'$.

The operation of such construction is quite simple. If the tank be empty, the float C will by its weight, through the mechanism before described, force the valve F up against seat $F'$, and the valve $G'$ will be full open. Water will consequently flow slowly through leaks $f'$ and pass at $d$ into the tank, the inflow being so slow that no water will as yet pass up through the after-filling pipe E. As the float C ascends, the inflow of water will increase in rapidity and the tank will rapidly fill. When the tank shall have partially filled, the float G will close its valve $G'$ and limit the flow of water into the tank, and a portion of the water directed into chamber D will consequently be deflected up pipe E to effect the after-filling of the closet, and as only a portion of the inflowing water is so utilized, the remainder flowing into the tank, it will be seen that the after-filling flow is not so rapid as by its rush to empty the trap or traps of the closet proper, this after-filling of the closet being to insure the proper amount of water in the closet trap or traps, which traps, as is well understood, are frequently emptied by the rapid rush of the strong after-wash of closets. As the float C rises it will permit the valve F to move toward seat $F^2$, and when the float C reaches its highest point such valve F will rest against seat $F^2$ and entirely shut off the supply of water.

It is preferred to support the valve-seat $F'$ adjustably, so the extent of play of the valve F may be varied. To this end I support the seat $F'$ on a frame-like portion $F^3$, which has a threaded connection with the cap $F^4$ of chamber D, which cap is also threaded into place, so that both such parts $F^3$ and $F^4$ may be adjusted to adjust the position of the seat $F'$. It will also be seen that the connecting-pipe E is elevated at its intermediate portion, so as to require a certain amount of water-pressure to force the water over it. In effecting a communication between the discharge end of this connecting-pipe E and the discharge of the tank it is preferred to provide a pipe $E'$, connecting with such discharge and opening at its upper end above the normal high-water mark, the pipe E being made to open into such pipe $E'$, and the latter being larger than the pipe E, as shown, the pipe $E'$ forming also an independent overflow.

The valve $a^2$ is by preference provided with a bar $H'$, by lifting which the valve may be lifted or opened. I regard this bar $H'$ as a part of the valve and shall so consider it in the following description and claims. In the construction shown the bar $H'$ is pivoted at one end at $h^4$ and connects between its ends with the valve proper, and is provided on the free side of its pivot with bearings or portions $h'$, $h^2$, and $h^3$, which bearings are preferably the end walls of slots, as shown.

The valve-opening lever I is pivoted at $i$, and has a weight $I'$ on its outer arm, which operates to elevate its inner arm when the lever is free to operate. This inner arm is connected with the valve $a$, so that as it rises it will lift and open the valve. This connection is preferably effected by means of a bar $i'$, which is pivoted at its upper end to the lever I, and has near its lower end a hook or shoulder at $i^2$ to engage the bearing $h'$, as will be understood from the drawings.

To hold the valve open when opened by the lever I, I provide what I call the valve-holder, which detachably engages the valve when the latter is lifted and holds it open until they are detached or disengaged. This valve-holder J is preferably a bar pivoted at its upper end at $j$ to a suitable support $j'$, and provided near its lower end with a shoulder or hook $j^2$, which is arranged to engage the bearing $h^2$ of the valve and hold the valve open when it is lifted to position for engagement by the shoulder $j^2$.

To enable an adjustment of the holder to secure the valve at different heights, I make the support $j'$ of spring metal, secure it at one end to the frame-bar across the tank, connect the holder-bar J to the bar $j'$ between the ends of the latter, and secure the free end of bar $j'$, so it can be adjusted up or down. This is preferably effected by fitting it over a vertical guide-rod K, which is threaded and has nuts $k\ k$ above and below the bar $j'$, so the latter may be adjusted up or down to regulate the height at which the holder J will secure the valve. This rod K also forms the guide for the float $K'$, which ascends and descends on said rod with the rise and fall of water in the tank. One function of this float is to detach the valve-holder from the valve, which operation it accomplishes through the aid of a cam $J^2$, secured on the bar J in position to be engaged by the float as the latter descends, the side of the float engaging the cam and freeing the valve, so the latter will close. Manifestly the valve might be simply lowered as the valve-opening lever lowers; but it is preferred to secure a rapid closing thereof, which is effected by holding the valve open and then letting it drop to close it. The cam $J^2$ is also connected adjustably to the bar J, so it may be set up or down to vary the time at which the valve may close, so that the valve may be held open for a greater or less time, as may be desired.

The lever I is held with its weight end elevated by means of a latch $I^3$, which is preferably pivoted to the weighted end of the lever I, and has a shoulder $i^3$, which engages a bearing $I^4$ when the weight end of the lever I is elevated. The bearing $I^4$ is preferably a wall of a slot in a plate secured to the tank, such slot serving as a guide and keeper for the latch, and the latter being arranged to swing by gravity into engagement with the bearing, as will be understood. Now, when the weight I' is up and the latch $I^3$ is engaged with bearing $I^4$, the lever I cannot tilt to open the valve until the latch is released. To accomplish this, I employ suitable latch-releasing devices, which are preferably electrically operated, and comprise an electro-magnet $I^5$, having its armature $I^6$ provided with a hammer $I^7$, arranged to strike and release the latch, so that the weight of the lever may tilt it to open the valve. The electric circuit will be more fully described hereinafter; but I may say in passing that the closing devices are preferably arranged so that the circuit will preferably be closed for a short period of time in order that the hammer will be given a vibratory action and be caused to give the latch a repetition of blows, as such operation enables a certainty of releasing the latch with but a light current of electricity.

To insure the releasing of the latch and to prevent overflow of the tank, I provide therein a float L, having its arm L' pivoted and provided with a portion $L^2$, which portion $L^2$, when the water in the tank rises above its normal high-water mark, will engage and release the latch, so that the valve will be opened by its lever I; also, if dirt or other obstruction gets under the inlet-valve and causes the same to leak, then when the water rises above its high-water mark the automatic device will release the latch, discharge the water from the tank, and allow water to rush through the inlet and wash away the obstruction before it can be solidly embedded in the leather or gum valve-washer.

It will be seen that some provision is necessary to effect the tilting of lever I against the action of its weight, so that as the tank empties the said lever may be readjusted to its operative position—that is to say, with its weight end elevated. To this end I provide a weight construction which, when the tank is empty, overbalances the weight of the lever I and elevates the weight end thereof. This weighted construction is in turn overcome by the buoyancy of float K' when the tank fills, and is adjusted clear of the lever I, so the latter is free to be operated. This weighted construction is preferably a lever M, pivoted at $m$ and provided with a weight M', which may be adjusted along the lever-arm $m'$. This lever-arm $m'$ engages upon the valve-opening lever at $m^3$, and operates when arm $m'$ is lowered to depress the inner arm of the lever I and elevate the weight I'. The arm $m'$ is a springy or elastic plate of metal, and constitutes a yielding arm or portion of the lever M, which is acted upon by the float K', the elasticity of the arm preventing any undue straining of the parts when the float rises above its normal high position.

Suitable connections extend between the float K' and lever M, and consist, preferably, of a cup-shaped bearing-piece N, sliding on the guide-rod K above the float K', fitted to receive the upward pressure of said float, and connected by a rod or bar $n$ with the weight end of the lever M, so that when the float K' rises it will lift said weighted end of lever M clear of the lever I, so the latter will be free to operate when its latch is released. By such construction it will be seen that as the float K' descends the weight M' will descend, and the lever M will tilt lever I to elevate the weight I', so the latch will engage its bearing. The lever I will be held by its latch in such position until the latch is released. As the float K' rises it will lift the weighted end of lever M to free said lever from engagement with lever I, so the latter may operate to open the valve when its latch is released. I provide this lever M with an arm $M^2$ in front of its pivot, which arm bears an insulated circuit-closer $m^2$, which is moved, when the tank is full, by the tilting of lever M by the float K' to form an electrical connection between two contacts O' O', which form the terminals of a break O in the operating electrical circuit. This construction constitutes the preferred mechanism or devices for closing the break O in the circuit automatically by mechanism in the tank; but this feature is an important one in my invention, and I do not desire to be limited therein to the particular construction of the preferred devices as shown.

The operating electrical circuit P includes the electro-magnet $I^5$ and the battery Q, and has two breaks O and R, the former and its manner of closing being hereinbefore described, and the latter R being, it may be said, in a measure under the control of the user of the closet. The break O, it will be seen, is closed and opened automatically by mechanism in the tank. The break R may be arranged to be closed by means of a push-button suitably disposed, as shown in Fig. 12, by an electric mat on the closet-floor, or by mechanism arranged to be operated by the opening or closing of the door; but it is preferred to effect the closing of circuit R by means of the devices shown in Figs. 6 and 7, in which the bars or plates R' R² are the terminals of break R, the free end of plate R² being movable toward and from plate R' and being normally out of such engagement, as shown in Fig. 7.

On the plate R², I provide a pivoted cam $r$, which has an arm $r'$, which renders the said cam rigid as against downward pressure on its outer side, but permits said cam to turn freely up to permit the arm S' on bellows S to move upward without closing the circuit-break R.

The bellows S is provided with an outlet-valve controlled by a set-screw S², so the valve may be set to permit the bellows to empty fast or slow. This bellows is connected with one arm of a lever T, the other arm of which is connected with and operated by a hinged plate or board U, which may be a part of the ordinary closet-seat or a board attached to such seat, as will be understood.

Now, the operation of this construction is quite simple. In using the closet the weight of the person on the seat will cause the bellows to expand by the bar or projection S' moving up past and tilting the cam $r'$ as it passes the same, but not effecting any meeting of the contacts R' and R² to close the break R. Now, so long as the weight of the person remains on the seat the bellows will retain the dotted position shown in Fig. 7 and the circuit will remain open. If the person gets off the seat, the bellows will slowly empty, its projection S' moving down slowly toward the cam $r$, with which it engages, and the contact R² is pressed against the contact R', closing the break R. As the bellows moves slowly, the circuit will remain closed some little time, enabling the magnet to operate its armature to cause a succession of blows against the latch to release the same. It will also be seen that if the person on the seat simply rises for a movement to adjust his clothing, latch the door, or the like the circuit will not close, as it requires some little time for the bellows to move down to close the circuit. It will also be seen that if the upper break O be open the closing of the lower break will not effect any operation of the electric devices, as the circuit will still be broken at O. This prevents any complete closing of the circuit when the tank is empty. If the tank be full and break O closed, the closing of break R will complete the circuit and the hammer will release the latch, the valve-opening lever will open the valve, and the flow of water will discharge from the tank. When the tank empties, it will refill in the manner more fully described hereinafter.

The circuit-wires are shown most clearly in Fig. 7. Where desired, a short-circuiting closer may be provided at V near the tank, so that a workman in adjusting or repairing the tank may test the working of the electrical devices without getting down from the tank to close the circuit at R. A lever W has a bar $w$ connecting it with the valve $a$, and is provided with a suitable pull cord or chain, so that the valve may be opened at the will of the operator if the electrical devices should at any time not operate properly—as, for instance, when the battery is spent and needs renewing.

The valve-seat of the supply-valve, having leaks in it, serves to diminish the supply of water to the tank, so that in case the valve-holder is adjusted very low and does not hold the valve $a^2$ but slightly open the water will come in slower than it is going out and will permit the float K' to descend sufficiently low to effect the closing of the outlet-valve. Except for the leaky construction of the valve the water might come in so fast that if the holder were adjusted low the float K' could not descend low enough to strike the cam and release the valve-holder, as the water would be coming in faster than it would pass out.

I do not in this application claim, broadly, the combination, with a valve, of a bar or its equivalent constructed for detachable engagement with said valve, and having a cam-like portion connected adjustably with it, and a float having a rod or portion by which to engage such cam-like portion, as such construction forms a part of the subject-matter of the application for patent, Serial No. 311,913, filed by me May 23, 1889.

Having thus described my invention, what I claim as new is—

1. The combination of the closet-tank valve, the valve-opening lever having a weight, a second lever having a weight and arranged to engage and overbalance the valve-lever, and a float arranged to overcome by its buoyancy the weight of said second lever and move the latter out of engagement with the valve-operating lever, substantially as set forth.

2. In a sanitary service-tank for water-closets, the combination of the tank and its discharge-valve, the lever for opening such valve, the latch for securing such lever, devices for releasing said latch in the ordinary use of the closet, and an overflow-float having an arm arranged to release said latch when the water in the tank rises above the normal high-water mark, substantially as set forth.

3. The combination of the closet-tank, the discharge-valve thereof, valve-opening devices arranged to open the valve, a valve-holder independent of the said opening devices, arranged to engage the valve when the latter is opened and hold it open, and provided with a cam, and the float by which to engage said cam and disengage the holder from the valve to permit the latter to close, substantially as set forth.

4. The combination, with the closet-tank, its discharge-valve, and valve-opening devices, of the valve-holder by which to hold the valve open, a support for such holder, which support may be adjusted to set the holder to secure the valve at different heights, and the devices by which to secure the valve-holder support in different adjustments, substantially as set forth.

5. The combination of the closet-tank, its discharge-valve and valve-opening devices, the valve-holder arranged to engage said valve when the latter is opened and provided with a cam, the support for said holder, which support is adjustable vertically at one end, a guide-rod having threads and passed through the adjustable end of the valve-holder support, nuts on said rod above and below the valve-holder support, and a float sliding vertically on said rod and arranged to engage the cam of the holder and disengage the said holder from the valve, substantially as set forth.

6. The combination of the closet-tank valve, the valve-opening lever having a weight, a second lever having a weight and arranged to engage and overbalance the valve-opening lever, a valve-holder by which to hold the valve when the latter is opened by the valve-opening lever, and a float arranged on its descending movement to disengage the holder from the valve and on its ascending movement to overcome by its buoyancy the weight of the aforesaid second lever and move the latter out of engagement with the valve-opening lever, substantially as set forth.

7. The combination of the closet-tank and its discharge-valve, the weighted valve-opening lever, the second lever having a weight and arranged to engage and overbalance the valve-opening lever, a vertical guide-rod, a cup-shaped bearing sliding on said rod, a rod or bar connecting said bearing with the said second lever, and a float movable upon the said guide-rod below the said bearing and fitted thereto, substantially as set forth.

8. The combination of the closet-tank, its discharge-valve, the weighted valve-opening lever, the weighted overbalancing-lever having a spring arm or portion, the float, by the buoyancy of which said overbalancing-lever is lifted out of engagement with the valve-opening lever, and intermediate devices between said float and the spring arm or portion of the lever, by which the buoyant action of such float is exerted against the yielding portion of the overbalancing-lever, substantially as set forth.

9. The combination of the closet-tank and its valve, the weighted valve-opening lever, the lever M, arranged to engage the valve-opening lever, and having an arm $m'$, provided with a weight M', by which to overbalance the lever I, the float K', the cup-shaped bearing N, and the rod $n$, connecting such bearing with the arm $m'$, substantially as set forth.

10. In a water-closet tank, the combination of the tank and its discharge-valve, the weighted lever, a connection between said lever and valve, whereby the tilting of the lever may open the valve, a latch for holding the valve open, such latch being independent of the valve-opening lever, and also independent of the connection between such lever and the valve, and a float by which to free said latch from the valve, substantially as set forth.

11. The combination, substantially as herein described, of the closet-tank having a discharge, the inlet or supply pipe, an after-filling pipe connected with the inlet or supply and arranged to conduct a portion of the supply to the discharge, and devices for throttling the supply at a point beyond the connection of the after-filling pipe therewith, substantially as and for the purposes set forth.

12. The combination of the closet-tank having a supply-inlet, a cut-off valve, by which said inlet may be opened and closed, a float by which to operate said cut-off valve, and a float and valve operating independently of said cut-off float and its valve, whereby to restrict the entrance of water to the tank, and a pipe connecting with the water-pipe between said valves and arranged to connect with the closet-bowl or the flushing-pipe leading thereto, substantially as set forth.

13. The combination of the closet-tank having the flushing-valve and devices for controlling the same, the supply-pipe B, the chamber D, the valve F and its seat $F^2$, the flow-restricting valve G', the floats and connections for operating said valves F G', and the connecting-pipe E, connected at one end with chamber D between the valves F and G', and communicating at its opposite end with the discharge of the tank, substantially as set forth.

14. The combination of the closet-tank, the supply-pipe B, the chamber D, having valve-seats F' and $F^2$ and outlet $d$, the pipe E, connecting with chamber D at a point between the valve-seat $F^2$ and outlet $d$, the valve F, operating between the seats F' $F^2$, the lever C' and float C, and the valve G' and float G, all substantially as and for the purposes set forth.

15. The combination of the closet-tank having a discharge, the supply-pipe, and an after-filling connecting-pipe E, arranged to conduct a portion of the supply to the discharge of the tank, and provided with an intermediate elevated portion and devices for throttling the supply-pipe beyond the connection of pipe E, substantially as described, and for the purposes specified.

16. In a water-closet tank, the combination of the tank and its discharge-valve, the valve-opening devices, electrically-operated devices for releasing said valve-opening devices, an electric circuit including such electric devices and having a break, as O, a closer for closing such break, a lever pivoted between its ends, supporting such closer at one end and having its other end weighted, and a float by which to tilt such lever to cause its closer to close break O when the tank is full, substantially as set forth.

17. The combination of the closet-tank having a discharge-valve, the weighted valve-opening lever, the latch for holding such lever with its weight elevated, the electrically-operated devices for releasing said latch, the circuit having a break O, the lever M, weighted and arranged to engage and overbalance the valve-opening lever, the said lever M being provided with a closer by which to close the break O, and the float by which to tilt the lever M against its weight, substantially as set forth.

18. In a water-closet, the combination, with the tank and devices by which to effect the flushing-discharge by the closing of an electric circuit, of the electric circuit having a break, a bellows adapted to be expanded, and a closer for such break, arranged to be closed by the bellows as the latter empties, substantially as set forth.

19. The combination of the tank, its discharge-valve, a weighted valve-opening lever by which to open said valve, a latch to hold said lever with its weight elevated, electrically-operated devices for releasing said latch, an electric circuit including such latch-releasing devices, having a break O, a lever M, having a weight arranged to overcome the weight of the valve-opening lever, and provided with a closer by which to close circuit-break O, and a float arranged to overcome by its buoyancy the weight of lever M, all substantially as and for the purposes set forth.

20. The combination, with the tank, its discharge-valve, the weighted valve-opening lever, and a weight by which to overbalance said valve-opening lever, of a float arranged to overcome by its buoyancy said weighted construction when the tank is full and free the valve-opening lever, substantially as set forth.

21. The combination of the tank, the weighted valve-opening lever, electrically-operated devices for releasing said mechanism to open the valve, an electric circuit having two breaks, a weighted lever arranged to overbalance the valve-opening lever and provided with a plate by which to close one of the breaks of the electric circuit, and a float arranged to overcome by its buoyancy the weight of the overbalancing-lever, whereby such lever may be adjusted to release the valve-opening lever and to effect the closure of the circuit-break, all substantially as set forth.

22. The combination, in a water-closet, of the circuit-terminals R' R' and the cam r, pivoted to terminal plate R², combined with the bellows, having a projection or portion arranged to operatively engage the cam r as the bellows empties, as set forth.

23. The combination, substantially as set forth, of the tank and devices by which to effect the flushing-discharge by the closing of an electric circuit, the electric circuit having a break O and a break R, a closer for such break O, devices in the tank by which to automatically operate the said closer, the terminals R' R², and the bellows and operating devices by which said bellows can operate to close the break R, substantially as set forth.

RICHARD A. L. BLONDEL.

Witnesses:
 WM. H. KAISER,
 PHILIP H. ENRIGHT.